(12) United States Patent
Dutu

(10) Patent No.: US 7,138,904 B1
(45) Date of Patent: Nov. 21, 2006

(54) BIOMETRIC SYSTEM AND METHOD FOR VEHICLE SECURITY AND OPERATION

(76) Inventor: Iulius Vivant Dutu, 8681 Viagiula, Boca Raton, FL (US) 33496

( * ) Notice: Subject to any disclaimer, the term of this patent is extended or adjusted under 35 U.S.C. 154(b) by 34 days.

(21) Appl. No.: 10/832,050

(22) Filed: Apr. 26, 2004

Related U.S. Application Data

(63) Continuation-in-part of application No. 09/982,056, filed on Oct. 18, 2001, now Pat. No. 6,727,800.

(60) Provisional application No. 60/245,026, filed on Nov. 1, 2000.

(51) Int. Cl.
*B60R 25/00* (2006.01)

(52) U.S. Cl. .................. 340/5.72; 340/5.61; 340/5.53; 340/5.6; 340/5.83; 340/5.82; 340/5.65; 340/5.8

(58) Field of Classification Search ............... 340/5.61, 340/5.53, 5.6, 5.83, 5.82, 5.65, 5.72, 5.8; 180/287
See application file for complete search history.

(56) References Cited

U.S. PATENT DOCUMENTS

| | | | | |
|---|---|---|---|---|
| 3,842,950 A | * | 10/1974 | Fontaine | 188/170 |
| 3,895,698 A | * | 7/1975 | Fontaine | 477/196 |
| 4,236,594 A | * | 12/1980 | Ramsperger | 180/167 |
| 5,686,765 A | * | 11/1997 | Washington | 307/10.5 |
| 5,751,073 A | * | 5/1998 | Ross | 307/10.5 |
| 6,100,811 A | * | 8/2000 | Hsu et al. | 340/5.83 |
| 6,140,939 A | * | 10/2000 | Flick | 340/825.69 |
| 6,232,874 B1 | * | 5/2001 | Murphy | 340/426.19 |
| 6,271,745 B1 | * | 8/2001 | Anzai et al. | 340/5.53 |
| 6,330,873 B1 | * | 12/2001 | Letang et al. | 123/322 |
| 6,430,488 B1 | * | 8/2002 | Goldman et al. | 701/36 |
| 6,548,915 B1 | * | 4/2003 | Geber et al. | 307/10.2 |
| 6,570,486 B1 | * | 5/2003 | Simon et al. | 340/5.1 |
| 6,614,920 B1 | * | 9/2003 | Floyd | 382/124 |
| 6,710,700 B1 | * | 3/2004 | Tatsukawa et al. | 340/5.53 |

* cited by examiner

*Primary Examiner*—Brian Zimmerman
*Assistant Examiner*—Vernal Brown
(74) *Attorney, Agent, or Firm*—Daniel S. Polley, P.A.

(57) ABSTRACT

Disclosed is a keyless system for operating and accessing a vehicle such as an automobile, truck, minivan, bus, airplane, train, boat, etc. Preferably, the user's fingerprint is his or her "right of passage" into the vehicle. The system includes fingerprint triggered access to the physical inside space of a vehicle and along with other commands, preferably voice activated and/or card/card reader, control the vehicle's various systems. The system is designed to perform optimally in less than perfect environmental conditions and is preferably provided with its own source of energy. The system also includes a controller and interface in communication with a fingerprint sensor.

20 Claims, 11 Drawing Sheets

FIG. 3

The AF-SI Sensor is packaged in a JEDEC-standard 68-pin PLCC (Plastic leaded Chip Carrier) format. Key dimensions in millimeters are shown in the table below the illustration.

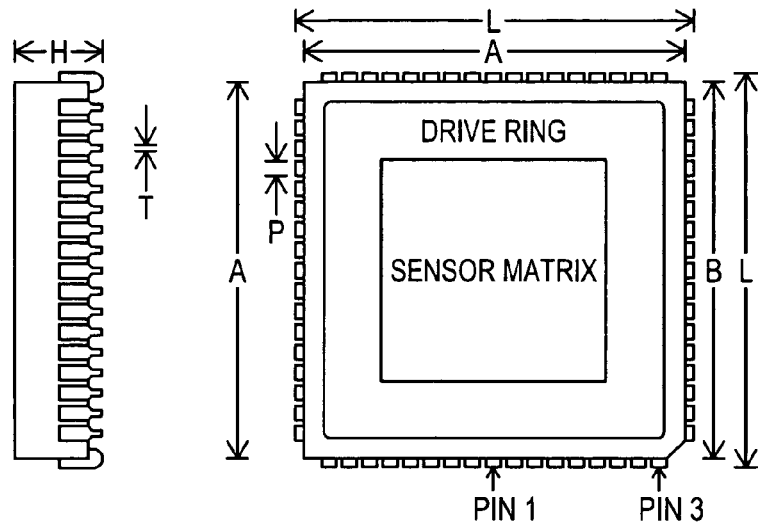

| L | | T | | A | | B | | H | P |
|---|---|---|---|---|---|---|---|---|---|
| Min | Max | Min | Max | Min | Max | Min | Max | Max | Basic |
| 25.02 | 25.27 | 0.33 | 0.53 | 24.13 | 24.33 | 24.13 | 24.33 | 3.50 | 1.27 |

All dimensions are in millimeters

Pin Assignments

| Pin | Mnemonic | Pin | Mnemonic | Pin | Mnemonic | Pin | Mnemonic |
|---|---|---|---|---|---|---|---|
| 1 | VDDD | 18 | DriveRing | 35 | DriveRing | 52 | DriveRing |
| 2 | VSSD | 19 | no connect | 36 | no connect | 53 | no connect |
| 3 | VSSA | 20 | no connect | 37 | no connect | 54 | no connect |
| 4 | VDDA | 21 | FingerPlate | 38 | FingerPlate | 55 | no connect |
| 5 | VDDD | 22 | FingerExcite | 39 | FingerExcite | 56 | no connect |
| 6 | VSSD | 23 | VSSD | 40 | VSSD | 57 | Reset |
| 7 | VSSA | 24 | VDDDon | 41 | VDDDon | 58 | Charge |
| 8 | VDDA | 25 | VDDAon | 42 | VDDAon | 59 | FingerDrive |
| 9 | no connect | 26 | VSSA | 43 | no connect | 60 | VDDAon |

FIG. 4

INTERFACE
(D/A Voltage Conversion)

PARALLEL PORT

LIST PARTS SERIAL PORT

| NR | VALUE | DIGIKEY PART NO. | DESCRIPTION |
|---|---|---|---|
| 1 | BS1-IC BASIC | Stamp1-ND | Basic Stamp Module |
| 2 | TD62064 | TD62064AF-ND | TTL,5V CMOS Input-1 |
| 3 | PT78ST105 | 78ST105HC-ND | Integrated Switching R |
| 4 | R1;R2 18K | P18KECT-ND | |
| 5 | R3;R4 220 | P220ECT-ND | |
| 6 | C1;220uF/35V | P10296-ND | |
| 7 | RL1;RL2 | 255-1001-ND | TQ Series Telcom Rel |
| 8 | Swa | CKN9004CT-ND | Switch mom key guil |

PARALLEL PORT

| NR | VALUE | DIGIKEY PART NO. | DESCRIPTION |
|---|---|---|---|
| 1 | SOKET FUSE | WK0011-ND | SOKET PC MOUNT |
| 2 | F1(2A) | WK2057-ND | FUSE FAST ACTING |
| 3 | C1 220uF/35V | P10296-ND | |
| 4 | PT78ST105 | 78ST105HC-ND | |
| 5 | C2;100uF/10V | P10219-ND | |
| 6 | R1;330 | 330XSK-ND | |
| 7 | RL1;RL2 | 255-1001-ND | |
| 8 | LED | P377-ND | |

FIG.6/11

| | | | |
|---|---|---|---|
| 1 | RL1 | Z842-ND | 4Contacts 12v Manf |
| 2 | RL2 | Z744-ND | Power Relay |

FIG. 9

BIOMETRIC SYSTEM AND METHOD FOR VEHICLE SECURITY AND OPERATION

This application is a continuation-in-part of U.S. application Ser. No. 09/982,056, filed Oct. 18, 2001 now U.S. Pat. No. 6,727,800, which claims the benefit of and priority to U.S. Application No. 60/245,026, filed Nov. 1, 2000, all of the above-identified applications are incorporated by reference.

BACKGROUND OF THE INVENTION

1. Field of the Invention

The present invention relates generally to the operation of vehicles and particularly to the keyless system for operation, accessing and entry of a vehicle.

2. Description of Related Art

Approximately, ten to fifteen years ago, several different keys were required to gain access to the different systems of a car: (1) one for entering the car, (2) one for the gas tank, and (3) one for the trunk. Eventually, the three keys were replaced by only one for all three functions. The function of the key was further reduced by allowing the trunk and gas tank to be opened from the inside of the car either mechanically or electrically. Currently, the elimination of key functions have advanced for some cars by permitting entry (i.e. unlocking the doors) into the car by the use of a code or remote control. However, there is still a need in the art for a vehicle which is operated entirely without a key. It is to this effective resolution that the present invention is directed.

BRIEF SUMMARY OF THE INVENTION

The present invention discloses a keyless system for operating and accessing a vehicle. In the preferred embodiment the user's fingerprint or other biometric template or feature is his or her "right of passage" into the vehicle. Thus, the term "keyless" also refers to wireless remotes or starters also used to start and enter a vehicle, which a driver has to carry with him or her when leaving the vehicle.

In the preferred embodiment the system includes fingerprint triggered access to the physical inside space of a vehicle and along with other commands, preferably voice activated, control the vehicle's various systems.

The present invention system is designed to perform optimally (or at least without creating any problems) in less than perfect environmental conditions, such as mechanical vibrations, temperature variations, humidity, radio wave interferences. Preferably, the system is provided with its own source of energy.

It is an object of the present invention to provide a keyless system for operating and accessing a vehicle.

It is another object of the present invention to provide a keyless system for operating and accessing a vehicle using a fingerprint sensor, card/card reader and/or voice command technology.

It is still another object of the present invention to provide an interface which communicates with the various operation of the vehicle based on communications received from a fingerprint sensor, card/card reader and/or voice command system.

It is yet another object of the present invention to provide a system for operating and accessing a vehicle which does not require the operator to carry his or her vehicle or house keys, nor remember password (s) and/or code(s).

It is yet another object of the present invention to provide an option system for keyless operation and automatic starting of the vehicle. In this option system, after a finger is place on the sensor, and it is confirmed that the finger is from an authorized user, the system can provide the following functionality options: (a) open one or more doors of the vehicle; (b) enable the existing vehicle computer and/or the engine control module; (c) enable the injection and ignition systems of the vehicle; and/or (d) automatically start the vehicle.

It is yet another object of the present invention to provide a system which provides a valet parking mode which place limits on the use of the vehicle while the vehicle is driven by a valet parker or other individual that the authorized user wishes to restrict. In this system, a second finger of the authorized user (different from the first finger normally used to authorized the user) can be enrolled, registered or otherwise stored and is specifically defined to place the system in the valet parking mode when placed on the sensor. When this finger is placed on the sensor to control the vehicle, a signal, such as an analog signal, can be sent to the vehicle speed sensor input of the vehicle's engine control module to control the speed of the vehicle. The vehicle speed sensor monitors speed, which is one of the factors used to calculate the pulse width to the vehicle injectors. The level of the signal sent can determine the maximum speed setting, as the signal controls the length of the pulse width that controls the injection system or assembly of the vehicle. Thus, the system can be set such that in valet parking mode the vehicle can only reach a specific maximum speed (i.e. 25 M.P.H., 15. M.P.H., etc.). The system is not considered limited to any particular maximum speed. The pulse width sends instructions to the vehicle's injection system and can limit the top speed for the vehicle to maximum speed (i.e. 25 M.P.H., etc.) The system can stay setup in this condition until the authorized user changes this valet parking mode to regular by placing his or her finger associated with the normal mode of the keyless system on the fingerprint sensor.

When in the valet parking mode, the vehicle's doors can be locked and unlocked and/or the vehicle alarm enabled and disabled by several different methods: (1) using an existing remote control to open and close the doors and enable and disable any vehicle alarm; (2) using an existing mechanical key; and/or (3) using any other device that operates as a transmitter/receiver, such as, but not limited to, proxy cards, RF devices, IR devices, blue tooth technology, blue bottom technology, etc. In all of these methods, which can be used in the valet parking mode, the ignition and injections system can remain activated and the vehicle can be started from the switch/push bottom system described below for the first embodiment of the invention once the door is unlocked by one of the methods described above. As such, in valet parking mode, it is preferred that the vehicle doors are locked and/or the vehicle alarm enabled, by one of the methods discussed above, after parking the valet or other individual parks the vehicle (i.e. at a restaurant, shopping mall, party, etc.). While in valet parking mode, the system can also be programmed such that the vehicle's glove department, trunk, and gas tank are not accessible to the valet parker or other similar individual.

A mechanical and/or electrical system can also be provided for moving the fingerprint sensor from an outside position (external of the vehicle) to and from an inside position (internal of the vehicle). The sensor moving system will be connected with or otherwise in communication with the existing remote or other transmitter/receiver used for unlocking/locking the vehicle doors and/or enabling/disabling any vehicle alarm in the valet parking mode.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 3 is a computer screen illustrating the various adjustable engineering characteristics for the fingerprint sensor portion of the system;

FIG. 4 are front and side illustrations of a fingerprint sensor which can be used in accordance with the present invention, along with pin assignments, though other sensors can be used and are considered within the scope of the invention;

FIG. 9 is a part list for the interface portion of the present invention system;

DETAILED DESCRIPTION OF THE INVENTION

Figure 1:
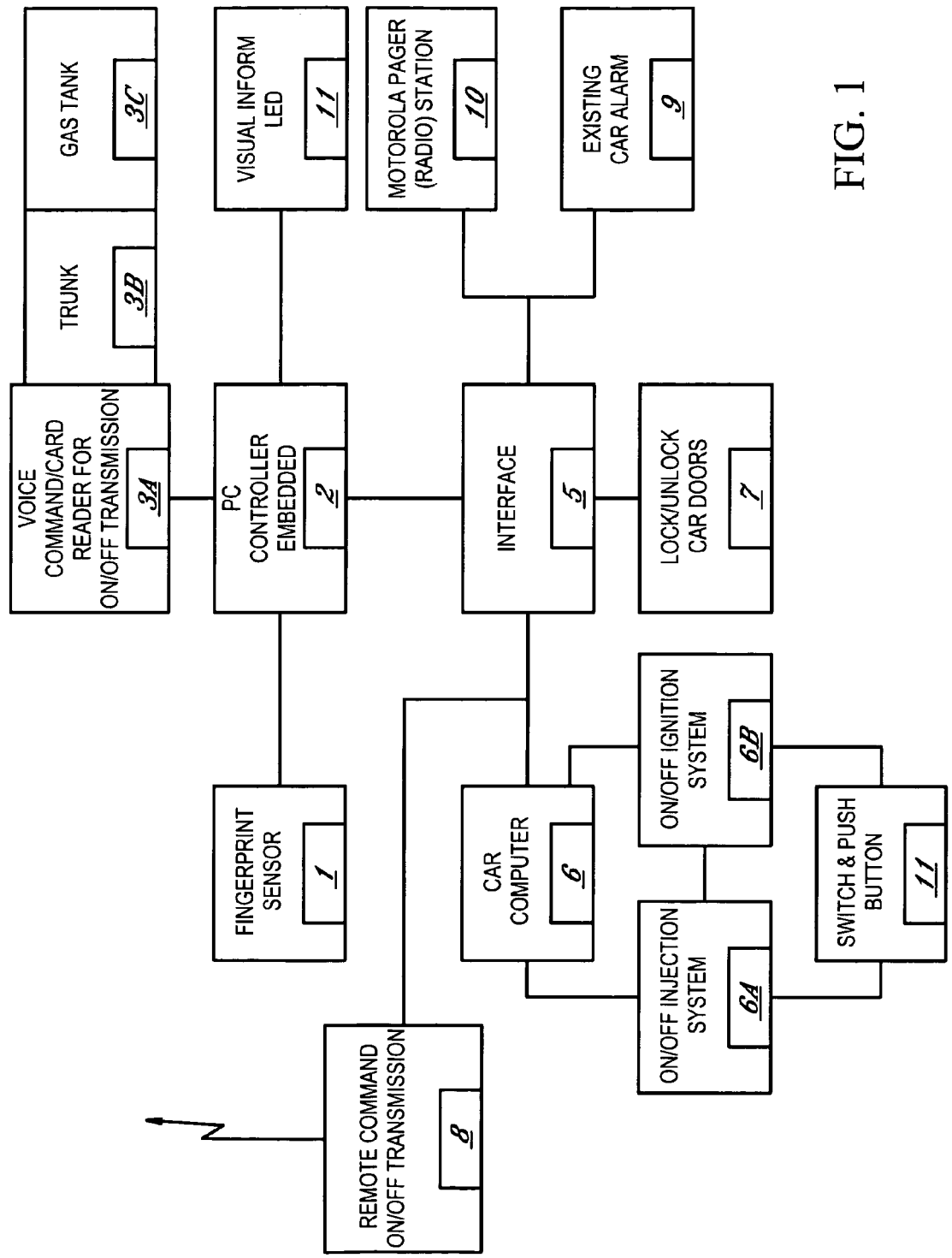
FIG. 1 is a block diagram of a first embodiment for the present invention.

As seen in the Figures, a keyless system for unlocking and operating a vehicle is illustrated. FIG. 1 illustrates a block diagram of the physical configuration for the preferred embodiment of the present invention.

Block 1 illustrates a Biometric sensor or other reader which can be an Integrated circuit fingerprint sensor (i.e. such as, though not limited to, sensors manufactured and sold by AuthenTec, Inc.), camera for face recognition or iris recognition. Preferably, a fingerprint sensor can be used, but such is not considered limiting. The sensor is a preferably durable, extremely reliable semiconductor device that can acquire a fingerprint image under the most rigorous real world conditions. Preferably, the sensor is enabled and performance-enhanced by advanced imaging control software. This highly adaptive software mechanism automatically manages and performance-tunes the image detection and acquisition process. Using Direct Digital Synthesis, an external source provides signal to the drive ring. Each element in the sensor matrix is provided with an under-pixel amplifier, a synchronous demodulator, and a spatial filter node. Each sensor row uses a multiplex to combine the output of all elements into a single signal. When a finger is placed on the sensor matrix, a very small signal is coupled from the drive ring to the sub dermal layer of the skin (See FIG. 4 for Sensor Matrix and Drive Ring). This signal follows the ridges and the valleys of the true fingerprint image. A fingerprint image is scanned by digitizing the outputs from one sensor row at a time in an image, power is applied to the selected row, enabling the row to drive an analog channel bus. The sample and hold outputs are digitized and sent serially via the host interface to the True Print imaging processing algorithm. Additionally, various types of sensors, including fingerprint sensors, can be used and are also considered within the scope of the invention.

Block 2 illustrates the PC Controller for the system. In one embodiment the controller can be a single board computer and/or an embedded system, though such is not limiting. The PC Controller stores the authorized data biometric template information.

Block 5 illustrates the Interface component of the system. In certain configurations where direct communication between certain components may be employed, the interface component may be eliminated.

Block 10 represents a remote pager station. The typical break-in warning sensors of a vehicle's alarm system are connected to the "IN" signal of a remote pager station (Block 10), such as, but not limited to a Motorola station. Once the sensors are activated, the Motorola station will transfer from reception to transmission mode, allowing the owner's pager (on the same wavelength) to receive the warning signal.

Block 8 illustrates a remote command for turning on/off the vehicles transmission. To call the pager, a 7-digit code recognition may be necessary or some other code may be required. Where a 7-digit code is used, the "off" 7-digit code can be different from the "on" 7-digit code, thus eliminating possible errors in calling the pager. The invention is not considered limited to 7-digit codes. Other remote activation technology can also be used in replace of the preferred paging technology. All are considered within the scope of the invention.

These features provide for an alarm and security of the vehicle.

It should be apparent the internal mechanical and electrical function and structure of unlocking/locking the door, start the engine (injection and ignition), opening the gas tank and trunk, etc. remain the same. The invention merely replaces the use of a key or remote starter by a keyless system (without the user having to remember to carry a key or starter with him or her) to initiate these functions. The various components of the system can be connected with each other through conventional standard wiring, cables, wireless technology and other conventional standard structure and devices.

A two color LED assembly (i.e. green and red, though not limiting) can be directly connected and in communication with the interface to provide a visual state of the vehicle. The assembly takes the electrical signal and transforms it into a light signal. "Red" can indicate that the doors are locked, while "green" can indicate that a proper read by sensor 1 has occurred and access within the vehicle is permitted (i.e. the door has been unlocked). Other definitions for the colors, as well as other colors or more than two colors, can be used and are all considered within the scope of the invention. Furthermore, other light assemblies and other visual or audio indicators can be used in lieu of the preferred LED assembly and all are considered within the scope of the invention.

The location of sensor 1 is preferably under the driver's side mirror, though such is not considered limiting, and other areas of the vehicle can be used and are considered within the scope of the invention. When attached to the driver's side mirror, the sensor is preferably installed on the fixed part of the mirror frame or cover without affecting the movement of the mirror. The sensor can be covered and protected by a case (preferably plastic) having a movable cover to permit access to the sensor during use. The case and cover protect the sensor from direct mechanical strikes, water, snow, etc.

Figure 11:
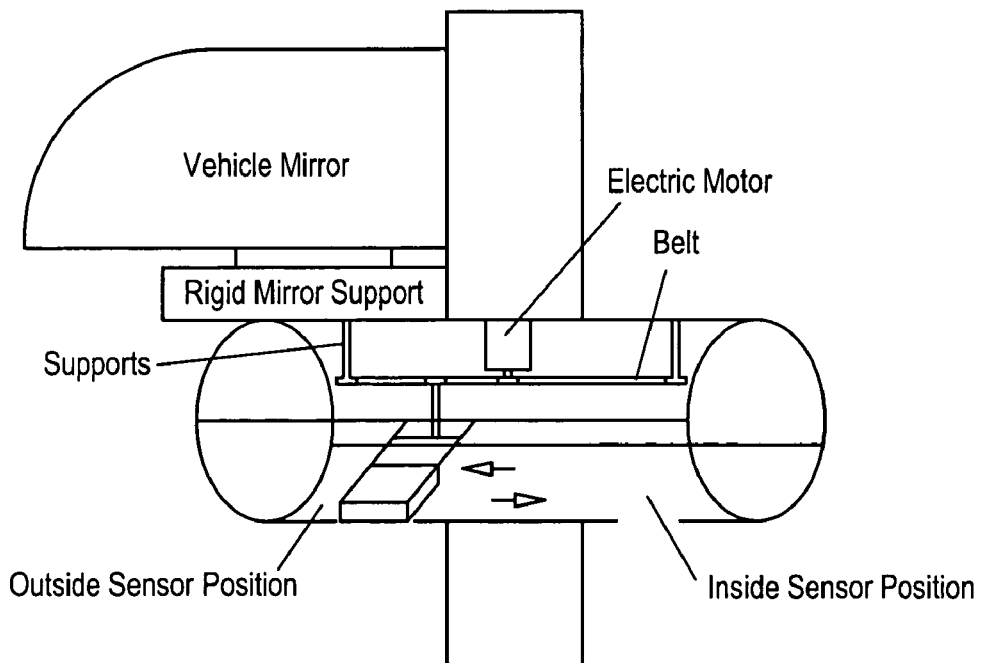
FIG. 11 is an illustration showing one embodiment for moving the sensor to and from a first position to a second position.

One embodiment for a movable sensor configuration is shown in FIG. 11, which permits the sensor to be move from outside the vehicle to inside the vehicle and vice versa. In "normal" mode (not valet parking mode), where the user desires to use an existing remote to unlock and open the vehicle door, the user may still have to place his or her finger on the sensor in order to enable/start the vehicle for keyless operation. Where the existing remote is used to unlock the door, the embodiment shown in FIG. 11, or other conventional technology, permits the sensor to automatically move inside the vehicle from its outside position, where the user can place his or her finger for keyless operation of the vehicle. The mechanism for moving the sensor can include, but is not limited to, discreet parts such as a small electric motor or magnetic mechanism, with driver and limiters, to stop the sensor in a fix position inside or outside of the vehicle.

When the vehicle doors are closed and/or locked using an existing remote, or other systems (proxy RF, IR, etc.), the system can automatically go "off", and can be turned back on with the user's authorized finger. Where the vehicle doors are unlocked/opened from the existing remote, etc., only access within the vehicle can be provided. The system can be set up so that to operate and/or start the vehicle, the authorized user must still place his or her finger on the sensor to enable the system, with the sensor position being inside the vehicle. The system can be set up such that when the existing remote, etc. is used to close/lock the vehicle doors, the engine control module (vehicle computer) disconnects and the vehicle cannot be started until an authorized user places his or her finger on the sensor. The receiver of the existing remote can be represented as Block 9 (existing car alarm) in FIG. 1A.

Though not limiting, the system preferably operates at a temperature range which is compatible to the range of the vehicle, such as but not limited to, approximately −40° Celsius to approximately +85° Celsius. Additionally, the system preferably operates between approximately 7.5 Volts to approximately 18 Volts, though again such range is not considered limiting. Furthermore, the system preferably operates at a maximum of 0.8 Amps, and typically at 0.4 Amps, though again these figures are also not considered limiting.

Though preferably used with vehicles, such as automobiles, sport utility vehicles, minivans and trucks, the present invention is not limited to such. Thus, the term vehicle for purposes of the invention and claims is considered to also include, in addition to the above, airplanes, boats, buses, trains, blimps, helicopters, etc.

FUNCTIONALITY AND INTERCONNECTIONS

The present invention uses the interface (Block 5) in order to open/close doors and enable/disable the car computer without using a key. The fingerprint sensor (Block 1) which reads the fingerprint preferably authorizes all the commands, submitting them consequently to the controller PC2 (Block 2).

Once scanned and recognized (matching the data stored in the database) by the controller PC2, the fingerprint authorizes the Interface (Block 5) to communicate with the lock/unlock doors switch, permitting their locking or unlocking (Block 7).

Figure 7:
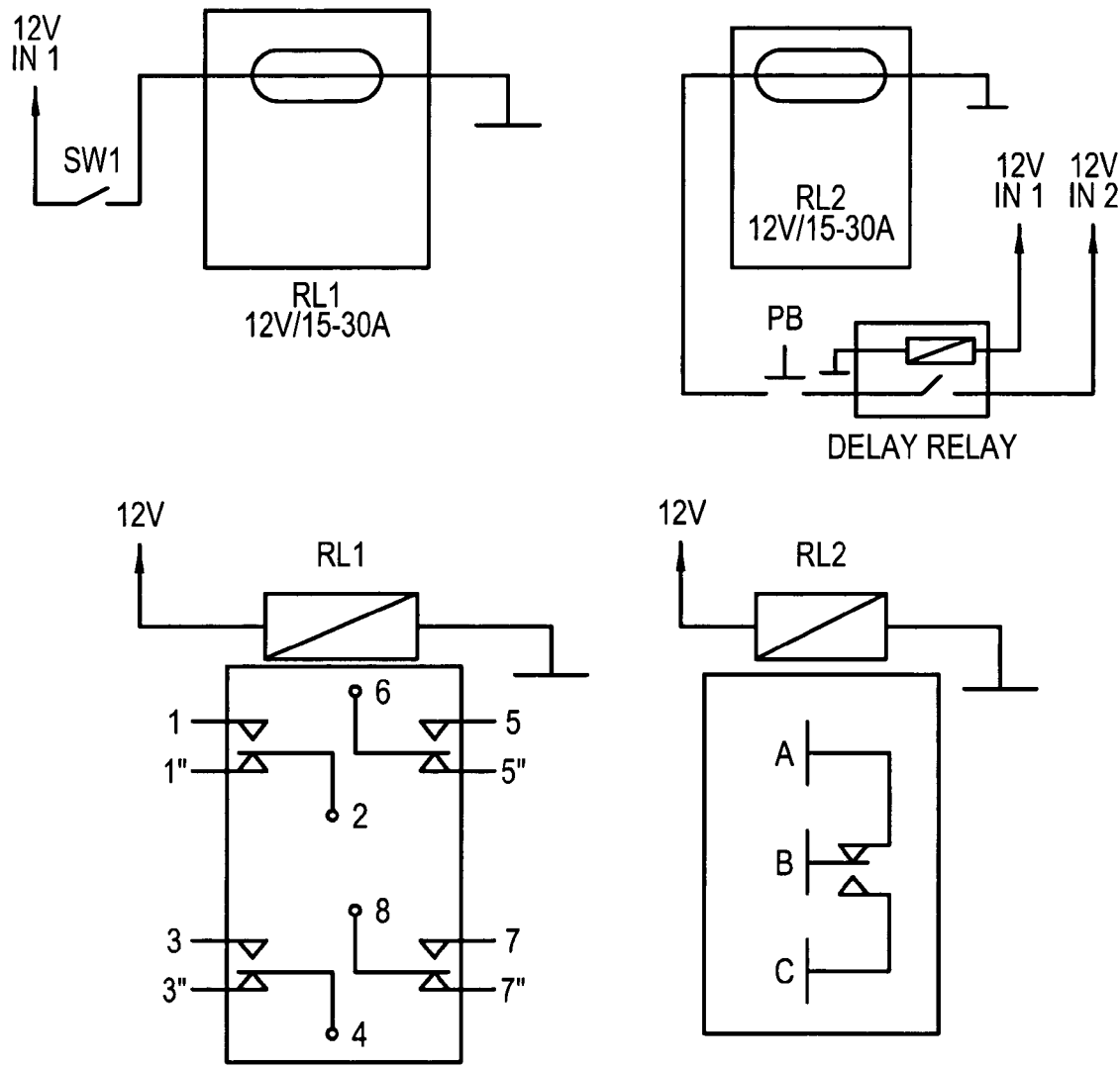
FIG. 7 is an electrical schematic of the relays in accordance with the present invention.
Figure 8:
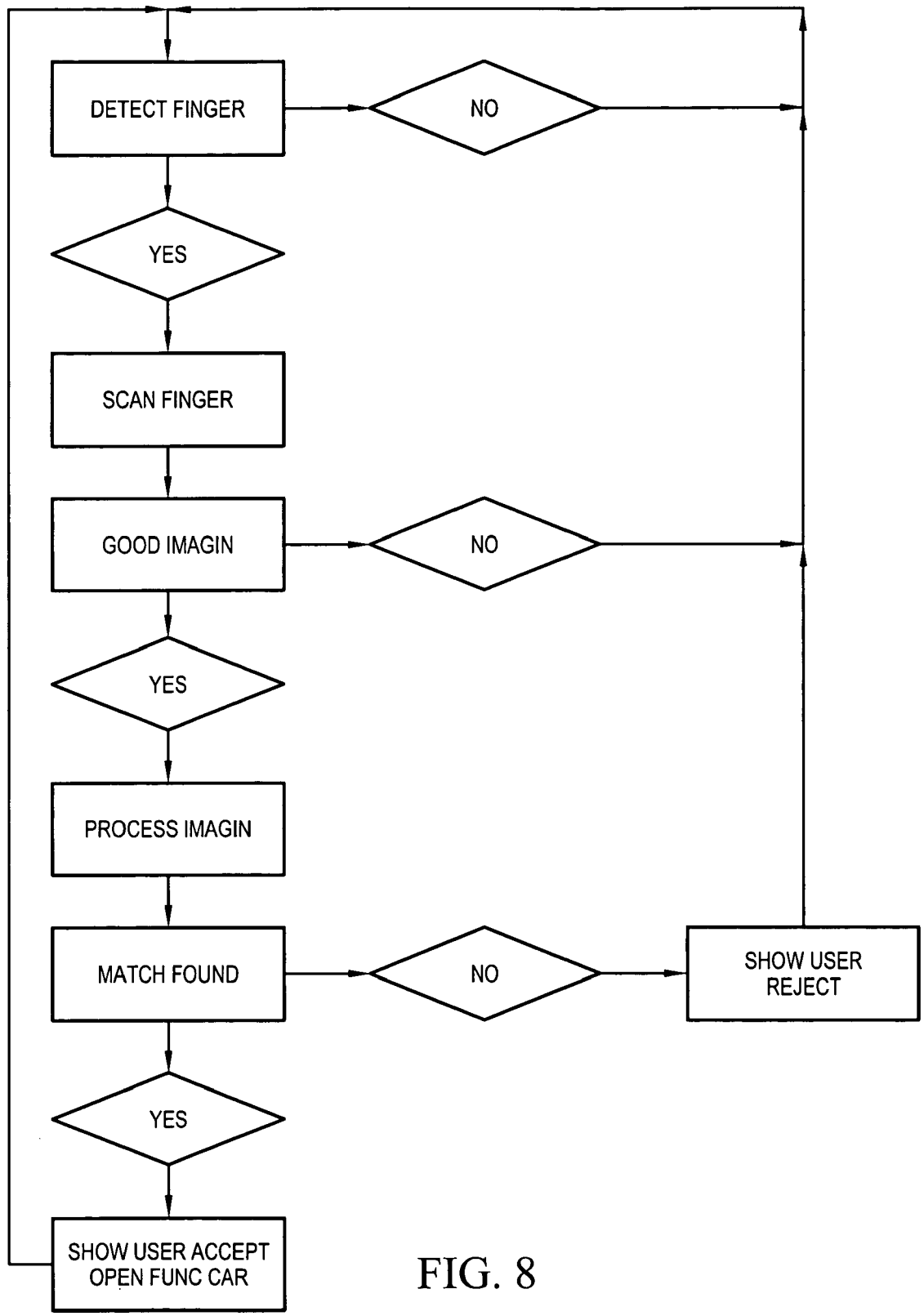
FIG. 8 is a flowchart for the software methodology of the present invention.
Figure 10:
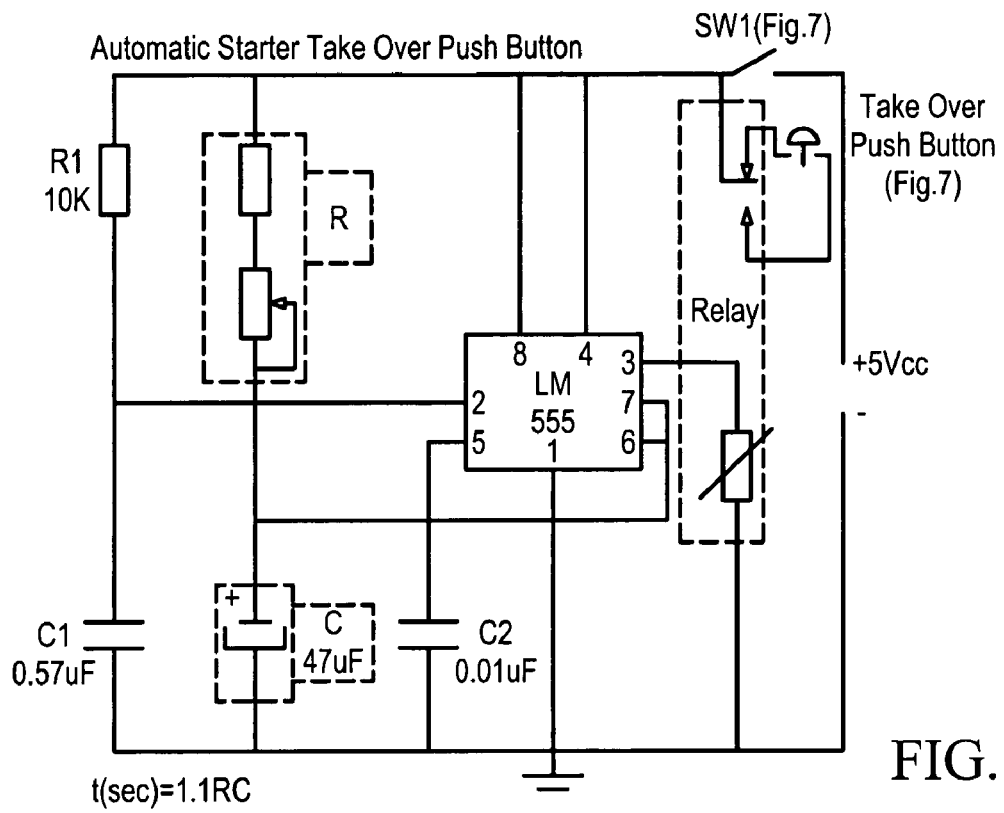
FIG. 10 is a schematic of the automatic starter taking over the push button portion of the system.

In the meantime, the Vehicle Computer or Engine Control Module (Block 6) receives the signal to initiate the Injection System (Block 6A) and the Ignition System (Block 6B). Once the System has been initialized, the vehicle can be automatically started without a key and without switch assembly, push button or other devices. In one embodiment uses a permanent contact (i.e. RL1 in FIG. 7 contact can be on, with switch staying on all the time) to take over the functionality of switch 11 (the functionality can be the same and the contact is made automatic, from its previous manual requirement, though manual contact can still be used and is considered within the scope of the invention). The manual contact can also make the switch be on. A temporary contact can be adjustable in contact time, and can be anywhere within the range of approximately 1.1 seconds to approximately 2.3 seconds, though other time values can be used and are considered within the scope of the invention. To take over the functionality of the push button, where manual can be made automatic after approximately 1 second (FIG. 7. Delay Relay), a permanent contact can be made (FIG. 7 RL2), with an On/Off Switch and a Push Button (Block 11). The vehicle can be turned off manually from the switch (FIG. 7, RL1). FIG. 10 illustrates the electric schematic for an automatic starter.

Thus, in an automatic configuration, the vehicle can shut down or start up from outside when an authorized finger is placed on the sensor, which causes the vehicle engine either to turn off or on and the vehicle doors to be either closed and/or locked or opened and/or unlocked. In this configuration, the switch and push button assembly, can be used only in the valet parking mode, since the valet parker will not be an authorized user and cannot start or shut down the system by placing his or her finger on the sensor.

To start the vehicle automatically, the vehicle transmission should be in a parking mode for safety purposes. Information regarding the transmission shifter can be sent to the system. In one configuration, the information is received by using a switch that can be closed when the transmission shifter is in a park position. Switch SW1 (FIG. 7) can be left connected/closed. Thus, in a transmission park position, when the authorized user places his or her designated finger on the sensor, all necessary switches are closed, resulting in the vehicle doors automatically unlocking (opening) and the vehicle engine automatically starting. The above described relay and switches can be already provided with an automatic transmission. At at least approximately the same time, the emergency (service) brake can be engage, and when the transmission shifter is moved from its "park" position, the emergency brake can be released.

Other features can be added to increase the security and make the system more useful. For example, where the authorized user is a teenager driving with a learners license, there may be time restrictions under law for when the user is permitted to drive the vehicle (e.g. between 6 A.M. to 7 P.M., etc.). Other restrictions may also apply or the vehicle owner may desire restrictions not based on any legal requirements. Thus, the system can be configured (user enrolled) such that the user can be authorized to during a certain time period or other restrictions. Thus, the user would not be authorized when placing his or her finger on the sensor outside his or her allowed time period. Though, an example of a teenager is mentioned above, it should be recognized that restrictions can be placed on any individual regardless of age and all are considered within the scope of the invention. Furthermore, as another non-limiting example, the restriction can be based on health reasons (i.e. eyesight, night vision, etc.). Furthermore, the user can be authorized for certain features but not for others (i.e. user enrolled to access the vehicle, but not able to start or operate vehicle, etc.).

Returning to the time restriction example, where the teenager (or other individual) attempts to use the vehicle out of his or her permitting time range, the system can be configured to still permit access within the vehicle, but without the ability to start or operate the vehicle. Where the teenager (or other individual) began driving the vehicle within the permitted time range and while driving the end of the time period is reached, the system can be configured to shut down once the vehicle transmission is placed in park. Alternatively, at a specific time before the end of the permitted time permitted (e.g. approximately ten minutes before the end of the time period, etc.), the system can be configured such that a signal (having a message) is sent to the vehicle's audio system informing and/or reminding the restricted authorized user that the permitted time period is about to end. The system can be configured to repeat one or more times after the message has been first transmitted. If the vehicle is still being operated by the restricted authorized user at a certain time period (at the end of the allowed time period, approximately two minutes after the expiration of the allowed time period, etc.), the system can be configured to send a second signal (with or without a message) which can adjust the speed to a lower maximum speed amount such as or similar to the maximum speed amount used in valet parking mode. The system can also be configured to turn on the vehicle's flashing lights and not allow the flashers to be stopped until the vehicle has been stopped. While, these events are occurring, the message to the restricted authorized user that his or her time is or about to be up, can still be transmitted through the vehicle's audio system. The system can be further configured, to only permit a non-restricted authorized user to change the car from this restricted use mode. Furthermore, besides time limitations, teenagers (or other individuals) can also be restricted in maximum speed, while driving in his or her permitted time period. To achieve this feature, the system can be configured similar to how it is configured for reduced maximum speed for in the valet parking mode. However, it is preferred that separate signals are used for restricted authorized users and valet parking mode. It should be recognized that the invention is not considered limited to any particular maximum speed, any particular time periods, or any particular restrictions. The invention can permit the ability to place any use restriction desired by the vehicle owner and/or non-restricted authorized user.

Block 3 controls, through voice commands, the transmission's starting and stopping (either by voice command and/or card/card reader), allowing the user the possibility of leaving the vehicle with the air conditioning running without any concern that it may be taken by somebody else, since only the recorded, recognized voice can access the car's controls. In order for this group to be functional, the user's voice has to be scanned, its characteristics digitally stored for future recognition. By the same voice commands, the trunk and gas tank can also be operated, other features can also be triggered from voice command.

The Interface (Block 5) also preferably activates any alarm system originally installed on the car (i.e. locking the car with the fingerprint can also turn the alarm on). To complete the alarm system an emission/reception station (Block 10) can also be provided for sending a signal to user's pager under certain conditions. If anyone tampers with the car while the user is away from the car, the alarm goes off and sends a signal to the user's pager, letting him or her know of the situation.

A numeric pager (connected to the national paging system) can be coupled between the interface and the computer. When it is in the "off" position, the system is functioning as if there is no pager at all. When it is in the "on" position, the computer will no longer take commands from the fingerprint sensor (the interface, respectively), not allowing even the authorized user to start the vehicle. However, the system can be programmed to continue to permit the user to open/close the doors and/or arm/disarm the alarm. This feature is illustrated in Block 8 of FIG. 1.

If the car is running and it receives the signal to stop, that signal will be validated once the engine is turned off by the authorized user, and cannot be turned back "on" before the pager goes back to the "off" position.

Figure 2:
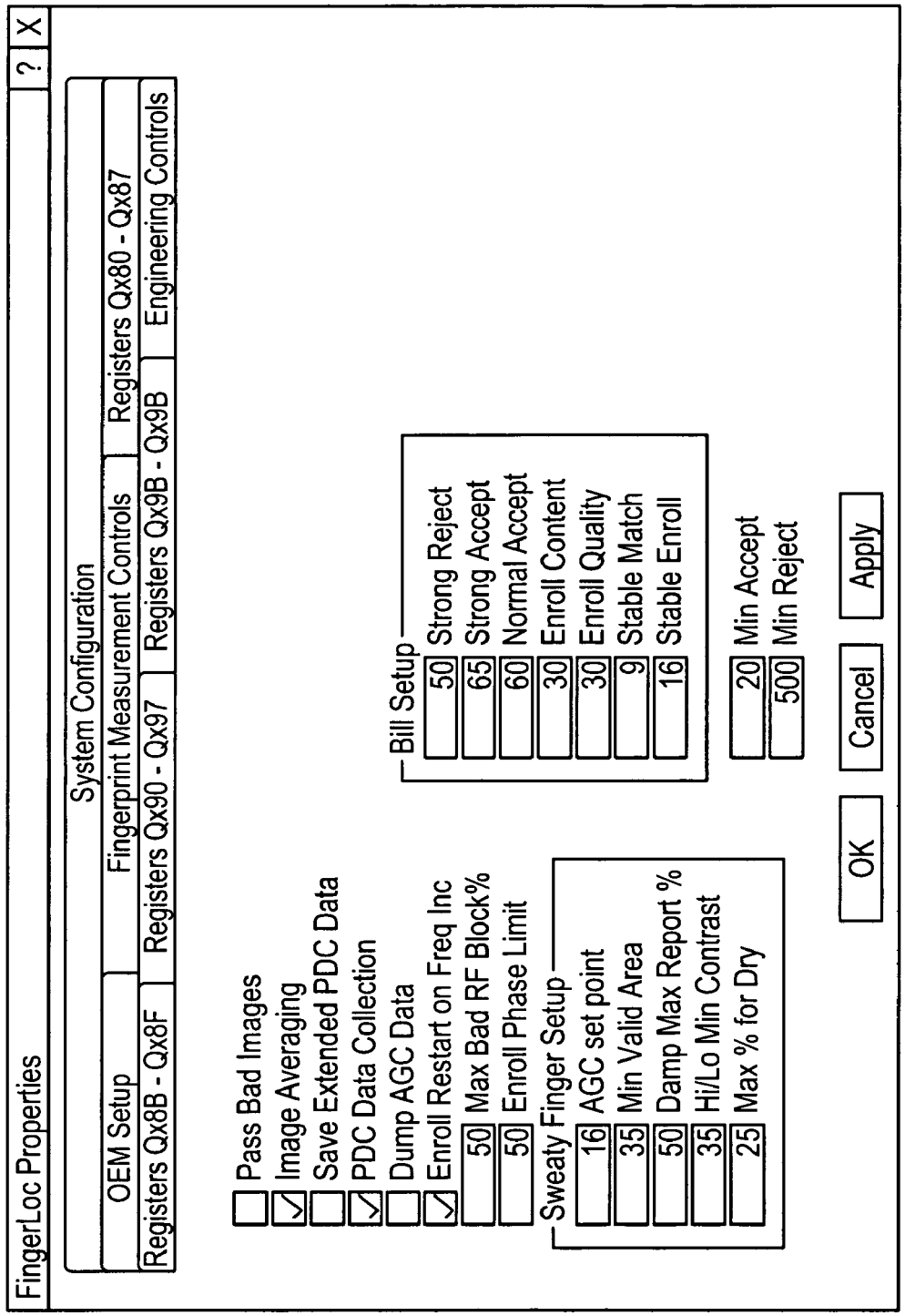
FIG. 2 is a computer screen illustrating the various adjustable parameters of operation for the fingerprint sensor portion of the system.
Figure 3:
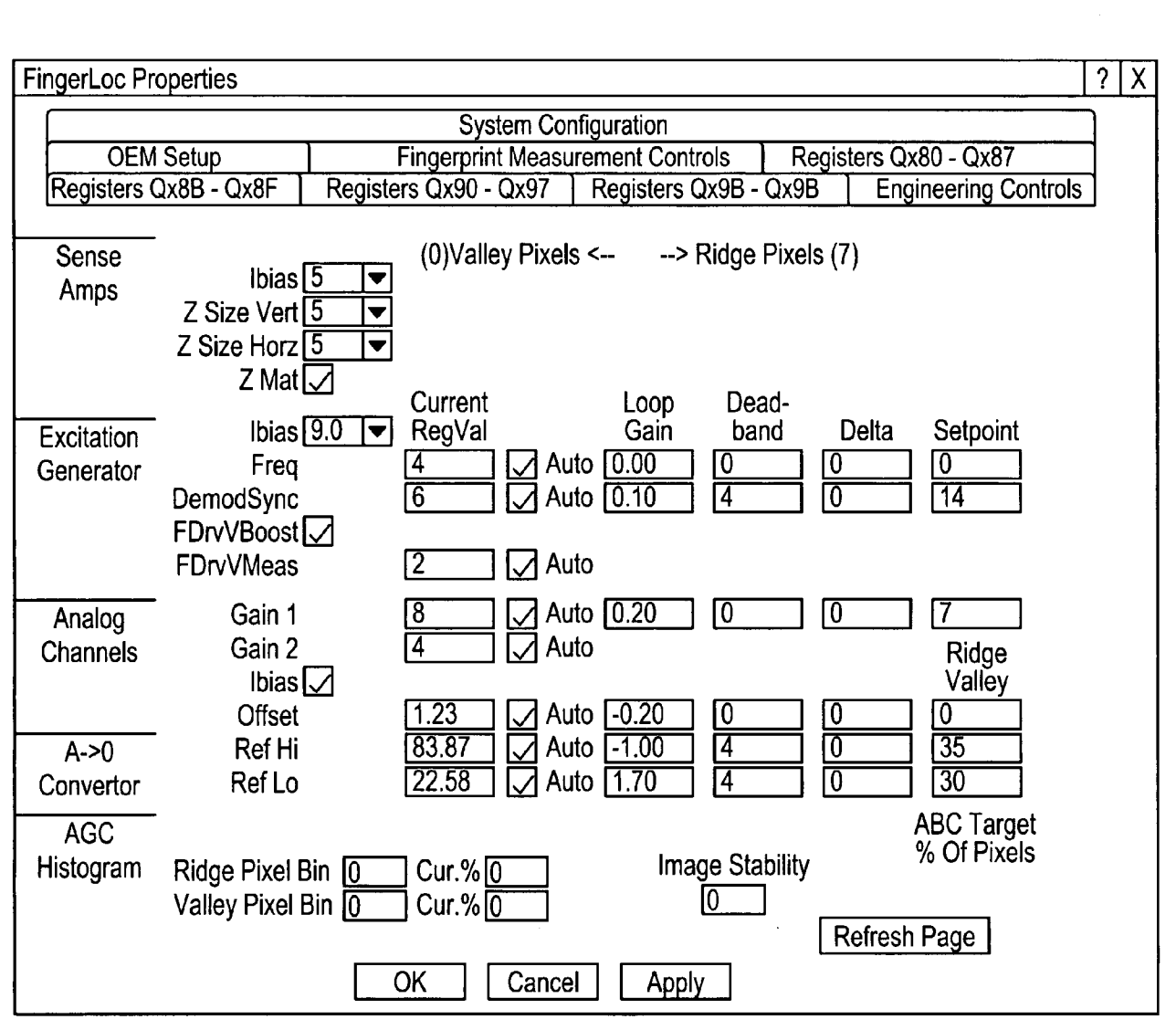
Figure 5:
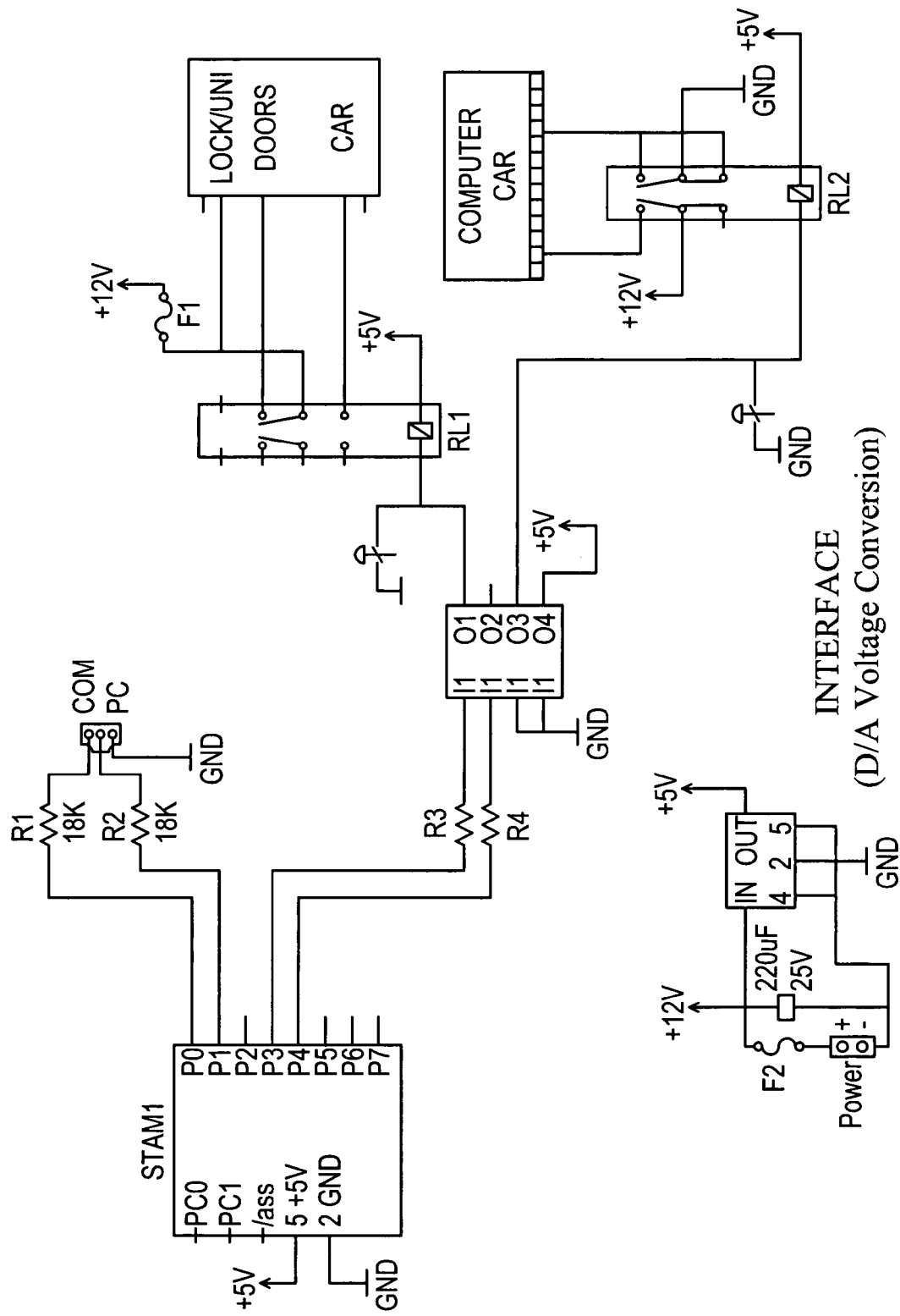
FIG. 5 is an electrical schematic for the serial port of the interface portion in accordance with the present invention.
Figure 6:
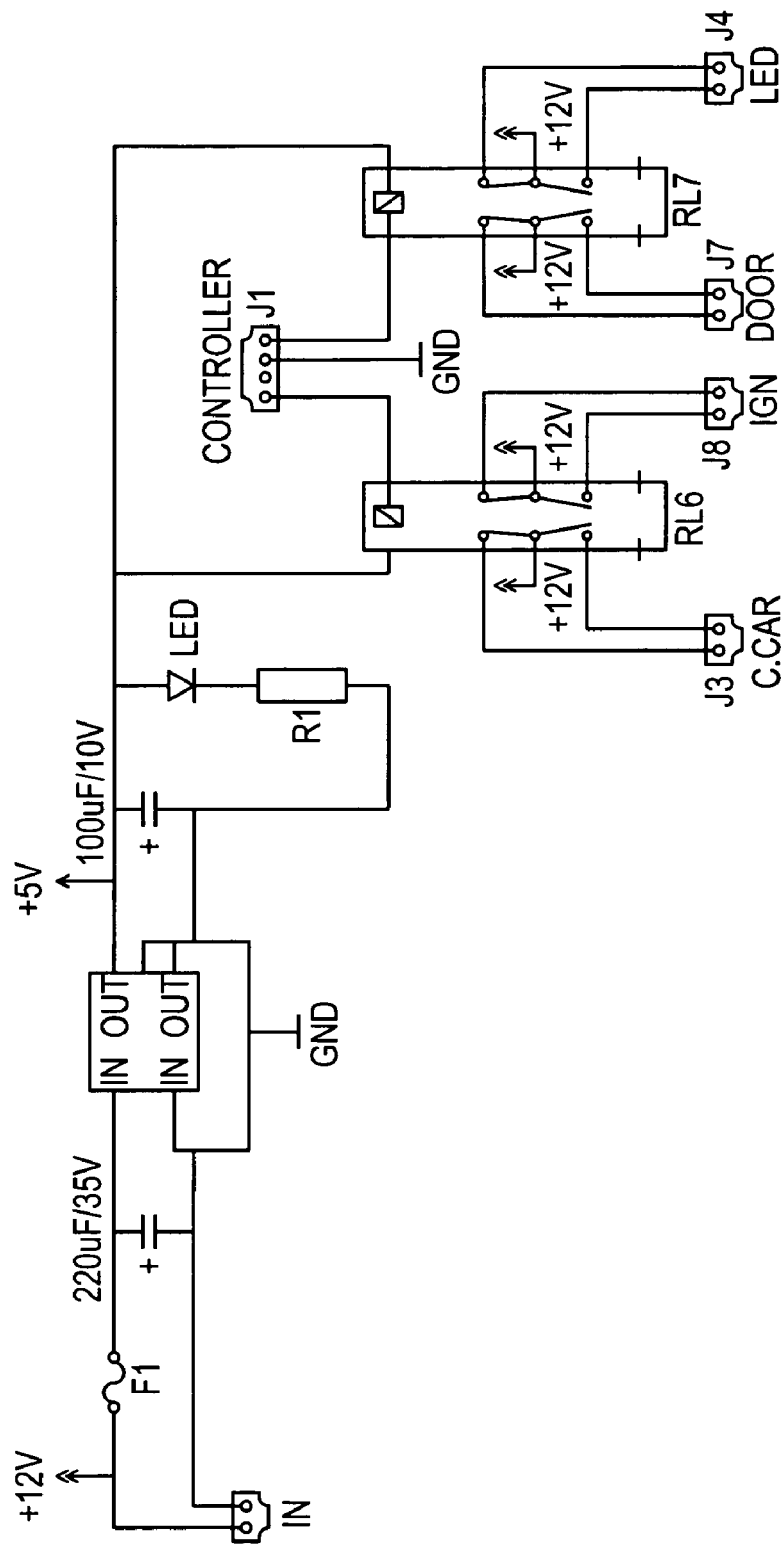
FIG. 6 is an electrical schematic for the parallel port of the interface portion in accordance with the present invention.

The fingerprint sensor is preferably not affected by any mechanical vibrations. Other factors (such as humidity and temperature fluctuations) which may effect its operation can be controlled by software. Internal software can also be used and programmed to control possible radio waves interference. A presentation of the settings used to control these influences as well as the sensor's characteristics appear in FIGS. 2 and 3.

All the components used to build the present invention system (Interface 5 included) are preferably chosen to perform very well even in drastic environmental conditions.

The system can be powered by the battery of the vehicle or a separate battery or other energy source, which can be designed to be charged by the vehicle's alternator. The system is designed to be very flexible and to operate in very hard conditions (i.e. water and salt in a marine environment). The system also provides the vehicle with security and an alarm.

Figure 1A:
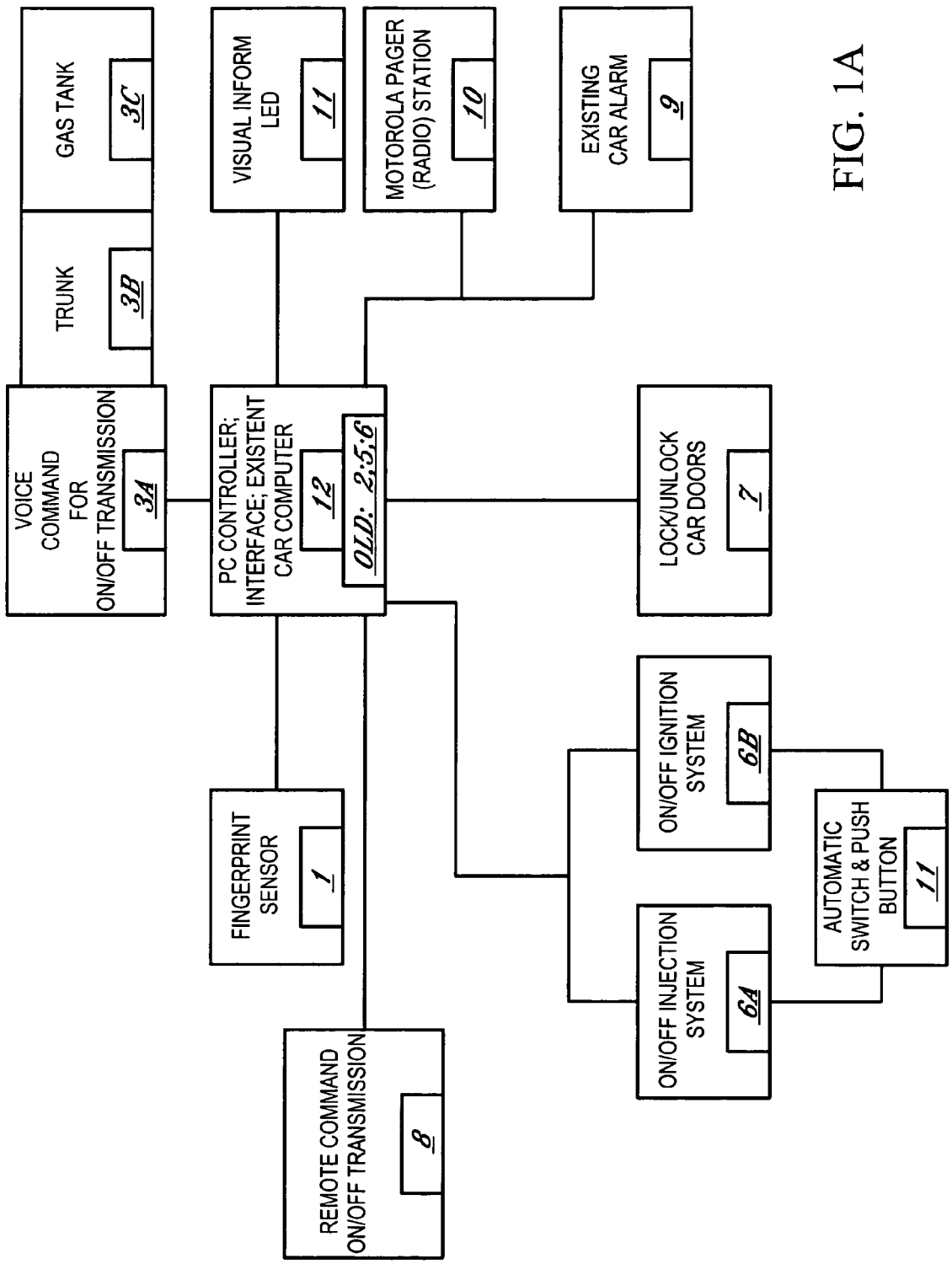
FIG. 1a is a block diagram of a second embodiment for the present invention.

All embodiments of the present invention can provide in one or more embedded boards (preferably one—See Block 12 of FIG. 1A) the functionality of the PC controller (block 2), the interface (block 5) and existing vehicle computer (block 6), without modifying the functionality of the system but possibly making the system more robust, useful, flexible, and/or reliable. A microprocessor can be integrated in the vehicle computer (engine control module) as shown in FIG. 1A (Block 12).

It should be noted that the term "vehicle computer" and/or "car computer" can be used interchangeably with "engine control module" and refer to the same function.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for keyless operation of a vehicle, said system comprising:
    a keyless member to access within an interior area of a vehicle without a mechanical vehicle key and to enable the vehicle for engine starting without a mechanical vehicle key; and
    a push button, switch assembly for starting an engine of the vehicle;
    wherein said keyless member secured to the vehicle and having a biometric sensor assembly that is movable back and forth from an outside position to an inside position with respect to a door of the vehicle.

2. A movable biometric sensor system for use with a vehicle, said system comprising:
- a biometric sensor assembly movable back and forth from an outside position to an inside position with respect to a vehicle; and
- means for wirelessly controlling back and forth movement of said biometric sensor from a remote location with respect to a location of the vehicle.

3. The system of claim 2 wherein said biometric sensor assembly identifying one or more authorized users and one or more restricted authorized users, wherein said system further comprising:
- means for permitting unrestricted control of the vehicle to an authorized user based on a valid read by said biometric sensor assembly; and
- means for permitting restricted control of the vehicle to a restricted authorized user based on a valid read by said biometric sensor assembly.

4. The system for keyless operation of claim 3 wherein said restricted authorized user is an individual having a learner's or restricted driver's license.

5. The system for keyless operation of claim 3 wherein said restricted authorized user is a teenager having a driver's license.

6. The system for keyless operation of claim 3 wherein said restricted control is a predetermined maximum speed that the vehicle can be driven by the restricted authorized user based on an identification of the restricted authorized user.

7. The system for keyless operation of claim 6 wherein said restricted authorized user is a valid parking attendant.

8. The system for keyless operation of claim 3 further including means for automatically preventing the vehicle from exceeding a predetermined speed limit when said vehicle is being operated by said restricted authorized user outside of his or her permitted restricted control.

9. The system for keyless operation of claim 8 wherein the predetermined maximum speed limit for the vehicle is set by sending a control signal to a vehicle speed sensor input of an engine control module for the vehicle to control a pulse width length that controls an injection system for the vehicle.

10. The system for keyless operation of claim 3 wherein said restricted control is a predetermined number of miles that the vehicle can be driven by the restricted authorized user based on an identification of the restricted authorized user.

11. The system for keyless operation of claim 3 wherein said restricted control is a set time period during which vehicle can be driven by the restricted authorized user based on an identification of the restricted authorized user by said means for identifying.

12. A system for keyless operation of a vehicle, said system comprising:
- a keyless member to access within an interior area of a vehicle without a mechanical vehicle key and to enable the vehicle for engine starting without a mechanical vehicle key; and
- a push button, switch assembly for starting an engine of the vehicle;
- wherein said keyless member having a biometric sensor assembly that is movable back and forth from an outside position to an inside position with respect to a door of the vehicle;
- wherein said sensor is movable by an electric motor or magnetic assembly for moving said sensor to either a fixed location inside the vehicle or a fixed location outside of the vehicle.

13. A system for keyless operation of a vehicle, said system comprising:
- a biometric sensor assembly secured to a vehicle and having a portion which is movable back and forth from an outside position to an inside position with respect to a door of the vehicle; and
- means for permitting access within the vehicle based on a valid read by said biometric sensor assembly.

14. The system for keyless operation of claim 13 further comprising means for automatically starting the vehicle based on a valid read by said biometric sensor assembly.

15. The system for keyless operation of claim 14 wherein said means for automatically starting only operating when a transmission for the vehicle is in a parking mode.

16. The system for keyless operation of claim 15 further comprising means for automatically engaging an emergency brake for the vehicle each time the vehicle transmission is placed in parking mode.

17. The system for keyless operation of claim 14 wherein said means for automatically starting the vehicle including means for identifying that a transmission for the vehicle is in a parking mode.

18. The system for keyless operation of claim 17 wherein said means for identifying includes a switch assembly having a switch which is required to be in a closed position for starting the vehicle, wherein said switch is in the closed position only when said transmission is in the parking mode.

19. The system for keyless operation of claim 14 wherein said means for automatically starting comprising:
- a PC controller in communication with said biometric sensor assembly and in communication with a vehicle computer or engine control module of the vehicle;
- wherein upon an authorized read by said biometric sensor assembly, said PC controller communicates to the vehicle computer or engine control module to initiate an injection system and an ignition system of the vehicle and the vehicle is automatically started through a contact assembly.

20. A movable biometric sensor system, said system comprising:
- a biometric sensor assembly connected to a structure; and
- means for moving at least a first portion of the biometric sensor assembly back and forth from a first position with respect to the structure to a second position with respect to the structure while a second portion of the biometric sensor assembly remains fixed and secured to the structure.

* * * * *